United States Patent
Gigioli, Jr.

(10) Patent No.: US 8,430,526 B2
(45) Date of Patent: Apr. 30, 2013

(54) METHOD AND APPARATUS FOR PRODUCING A UNIFORM IRRADIANCE DISTRIBUTION FROM AN ARRAY OF LIGHT EMITTING DIODES

(75) Inventor: George William Gigioli, Jr., Brookeville, MD (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 825 days.

(21) Appl. No.: 12/201,358

(22) Filed: Aug. 29, 2008

(65) Prior Publication Data

US 2010/0053979 A1    Mar. 4, 2010

(51) Int. Cl.
*F21V 5/00*    (2006.01)

(52) U.S. Cl.
USPC .......... 362/244; 362/311.02; 362/330

(58) Field of Classification Search ......... 362/27, 362/61–613; 359/385–390
See application file for complete search history.

(56) References Cited

U.S. PATENT DOCUMENTS

| | | | |
|---|---|---|---|
| 5,084,714 A | 1/1992 | Beaman et al. | |
| 5,523,591 A | 6/1996 | Fleming et al. | |
| 5,619,245 A | 4/1997 | Kessler et al. | |
| 5,690,417 A * | 11/1997 | Polidor et al. | 362/244 |
| 5,790,310 A | 8/1998 | Huang | |
| 5,803,579 A * | 9/1998 | Turnbull et al. | 362/516 |
| 6,152,590 A * | 11/2000 | Furst et al. | 362/545 |
| 6,170,971 B1 * | 1/2001 | Godbillon | 362/244 |
| 6,520,666 B1 * | 2/2003 | Beyerlein et al. | 362/244 |
| 6,834,986 B2 * | 12/2004 | Tsukamoto | 362/244 |
| 7,131,758 B2 * | 11/2006 | Ishida | 362/244 |
| 2002/0181231 A1 * | 12/2002 | Luk | 362/240 |
| 2003/0128543 A1 * | 7/2003 | Rekow | 362/259 |
| 2004/0062040 A1 * | 4/2004 | Blume et al. | 362/231 |

* cited by examiner

*Primary Examiner* — Alan Cariaso
(74) *Attorney, Agent, or Firm* — Alston & Bird LLP

(57) ABSTRACT

An apparatus and method for producing a spatially uniform irradiance in an image plane are provided. The apparatus includes an array of light emitting diodes (LEDs) which generate light (i.e., an image). The apparatus combines the outputs of an array of the LEDs in such a way as to produce a spatially uniform irradiance in an image plane some distance away. The apparatus includes an array of lenslets to form images of the emitting areas of the individual LEDs. The lenslets have a magnification, size and spacing such that the images produced by the respective LEDs are adjacent to one another and not overlapping. The irradiance distribution in the image plane is equivalent to an image of an LED whose emitting area is equal to the total area of the LED array, and whose total power is equal to the total power of the LEDs in the LED array.

24 Claims, 3 Drawing Sheets

METHOD AND APPARATUS FOR PRODUCING A UNIFORM IRRADIANCE DISTRIBUTION FROM AN ARRAY OF LIGHT EMITTING DIODES

FEDERALLY SPONSORED RESEARCH OR DEVELOPMENT

This invention was made with United States Government support under contract number HSHQDC-06-C-0028, and under contract number Low-Cost Bio-Aerosol Detection Systems (LBADS) 19069 both awarded by the U.S. Department of Homeland Security. The United States Government has certain rights in the invention.

FIELD OF THE INVENTION

Embodiments of the present invention relate in general to light emitting diodes (LEDs) and more particularly, to a method and apparatus for producing a uniform irradiance distribution from an array of light emitting diodes by using an array of lenslets to form images of the emitting areas of the individual LEDs in the array, or to form images of the ends of bundled fiber optics that are transmitting LED illumination, in a manner to generate a spatially contiguous and/or uniform irradiance.

BACKGROUND OF THE INVENTION

LEDs are used in a wide variety of applications and are being considered for even additional applications. For example, in today's day and age, it is advantageous to rapidly detect a release of potentially harmful biological agents, such as might occur as an act of war or terrorism, or as an accidental release. A number of government and other agency programs have addressed such detection, including the United States Department of Defense (DoD) Biological Integrated Detection System (BIDS) and the Joint Biological Point Detection System (JBPDS) program and the United States Postal Service (USPS) BioDetection System (BDS).

A current mechanism for very rapid, non-specific detection of possible biological threats is to measure ultra-violet (UV) excited fluorescence of individual airborne particles. Several sensors based on fluorescence sensing have been deployed, including the UV Active Protection Sensor (UV-APS) in the BIDS and the Biological Agent Warning Sensor (BAWS) in the JBPDS system. One drawback of using these sensors deals with the large costs involved. For instance, these sensors typically rely on relatively expensive YAG lasers and photomultiplier tube (PMT) optical detectors, and may cost $40,000 to $100,000.

Recent developments of UV LEDs that could potentially replace the more costly lasers as the excitation source in a fluorescence sensor permits the design of next-generation low cost fluorescence sensors. Regardless of the laser source, it is advantageous to match the wavelength of the excitation source to absorption characteristics of fluorophores in biological threat agents. Multiple excitation and/or fluorescence emission wavelength bands can be advantageously used to better discriminate targets for detection by permitting discrimination between and identification of specific chemical compounds or compositions.

One type of UV LED being considered for use in the design of a fluorescence sensor operates at a wavelength of 280 nanometers. This wavelength makes it a candidate for replacing a YAG laser, since it is near the peak excitation for tryptophan—one target of interest. However, one disadvantage of using current UV LEDs operating at a wavelength of 280 nanometers is that the LED output power in current devices is about a factor of 10 or more lower than what is desired for good sensitivity of the sensor.

In order to increase the output power of the LED, more input electrical current has to be supplied to the LED junction. However, inputting more electrical current to the LED junction results in an increase in the thermal load and a consequent reduction in the lifetime of the LED. Increasing the emitting area of the diode of an LED may help to distribute the thermal load, but typically results in current depletion in regions of the emitting area that lead to unacceptable non-uniformity in the projected spot distribution.

Currently, LEDs operating at a wavelength of 280 nm are available in 2×2 arrays on a single chip. The geometry of these LEDs is typically such that the emitting areas are 75 μm by 200 μm and are separated by 350 μm in a square grid arrangement. In principle, larger arrays of LEDs can be manufactured. The shape and dimensions of the emitting area are typically designed to maximize the total output power while maintaining an approximately spatially uniform emission pattern. Since these are competing performance parameters, there is always a trade-off of power for uniformity.

In view of the foregoing, there is a need for an UV-LED that can replace costly lasers as an excitation source in a fluorescence sensor or in other applications that provides suitable total power while reducing or eliminating tradeoffs between uniformity and emitting area size, thereby providing a sufficiently uniform irradiance in an image plane for the respective applications.

BRIEF SUMMARY OF THE INVENTION

A method and apparatus are therefore provided according to exemplary embodiments, which allow individual LED emitters to be optimized for total power, with no uniformity or emitting area size tradeoffs, by using a lenslet array to produce a uniform irradiance in an image plane. The lenslet array is matched in pitch to an array of LEDs or, alternatively, an array of optical fibers that are transmitting light from several LEDs, so that each lenslet forms a separate image of an individual LED or optical fiber core. The magnification of the images in an illumination plane are such that the resulting composite image is comprised of the abutting or slightly overlapping images of the LEDs or fiber cores, producing a uniform irradiance distribution wherein the resulting composite image has a total power equal to the total power of the LEDs in the LED array times the optical throughput of the lenslet array. The precise uniformity of illumination is not always critical. But it is generally desirable that there are no significant gaps in the illumination. So it is acceptable for the lenslet array to produce images of the LEDs or fiber cores that slightly overlap.

The method and apparatus of the exemplary embodiments may allow higher power excitation energy for fluorescence sensing while providing relatively uniform irradiance of particles passing therethrough. The uniformity of illumination provides a relatively repeatable signal for target particles, and for background particles that might interfere with detections of the target particles.

In one exemplary embodiment a device for uniformly irradiating areas of an illumination plane is provided. The apparatus includes one or more light emitting diodes (LEDs) arranged in one or more rows and columns of an LED array, each LED being configured to emit one or more rays of light. The apparatus further includes one or more lenslets arranged in one or more rows and columns of a lenslet array. Each lenslet is configured to receive one or more rays of light emitted from a respective LED. Each of the lenslets is configured to focus the one or more rays of light and transmit the focused rays of light. The apparatus further includes an illumination plane for receiving the focused rays of light in one or more areas arranged in one or more rows and columns of an array such that each area is entirely and uniformly illuminated by the focused rays of light that form one or more images that abut each other.

In another exemplary embodiment a method for uniformly irradiating areas of an illumination plane is provided. The method includes emitting rays of light from one or more light emitting diodes (LEDs) arranged in one or more rows and columns of an LED array and receiving the rays of light, emitted from the LEDs, at one or more lenslets arranged in one or more rows and columns of a lenslet array. The method further includes focusing the rays of light by each of the lenslets and transmitting the focused rays of light by each of the lenslets, and receiving the focused rays of light at a respective area of an illumination plane that has one or more areas arranged in rows and columns of an array. Each of the areas of the illumination plane receives the focused rays of light emitted by one LED and transmitted by one lenslet. The method further includes illuminating each area of the illumination plane entirely and uniformly with the focused rays of light, and forming one or more images that abut each other.

BRIEF DESCRIPTION OF THE SEVERAL VIEWS OF THE DRAWINGS

Figure 1:
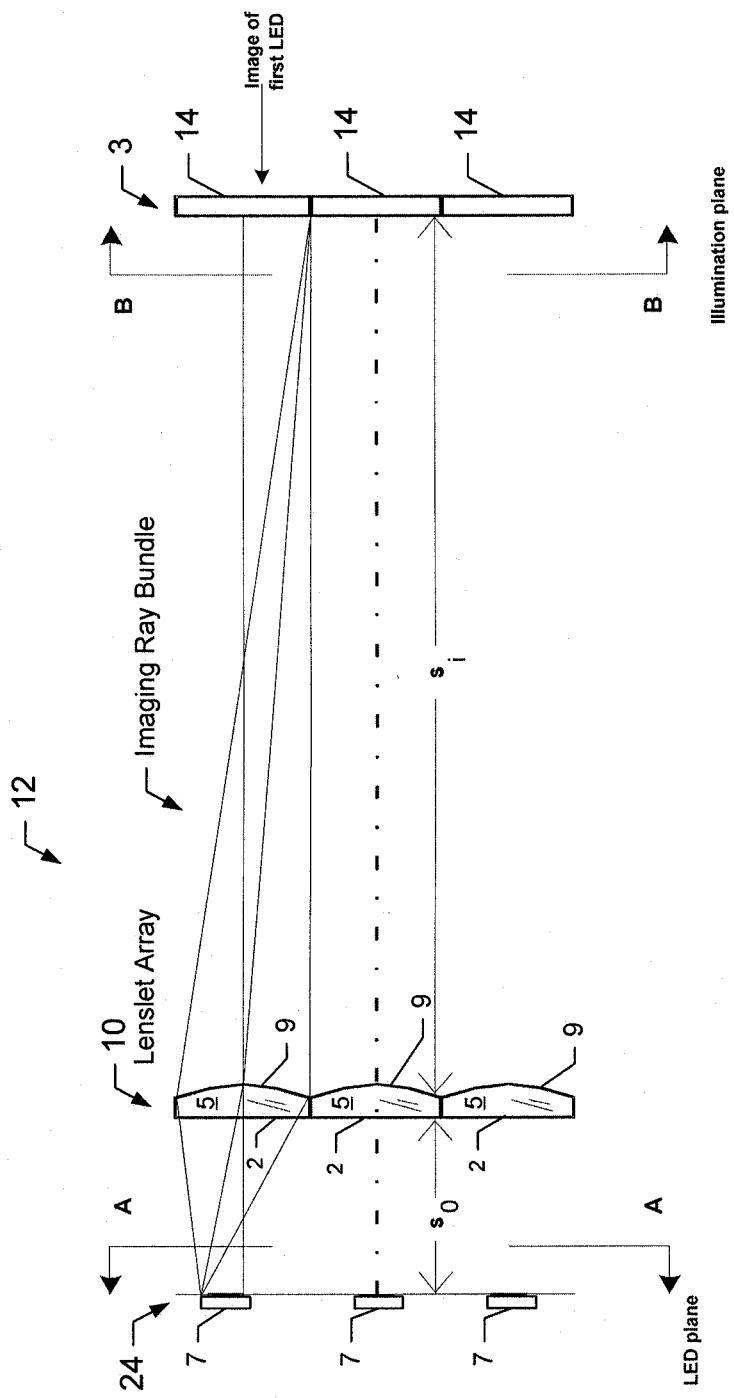
Figures 2, 3:
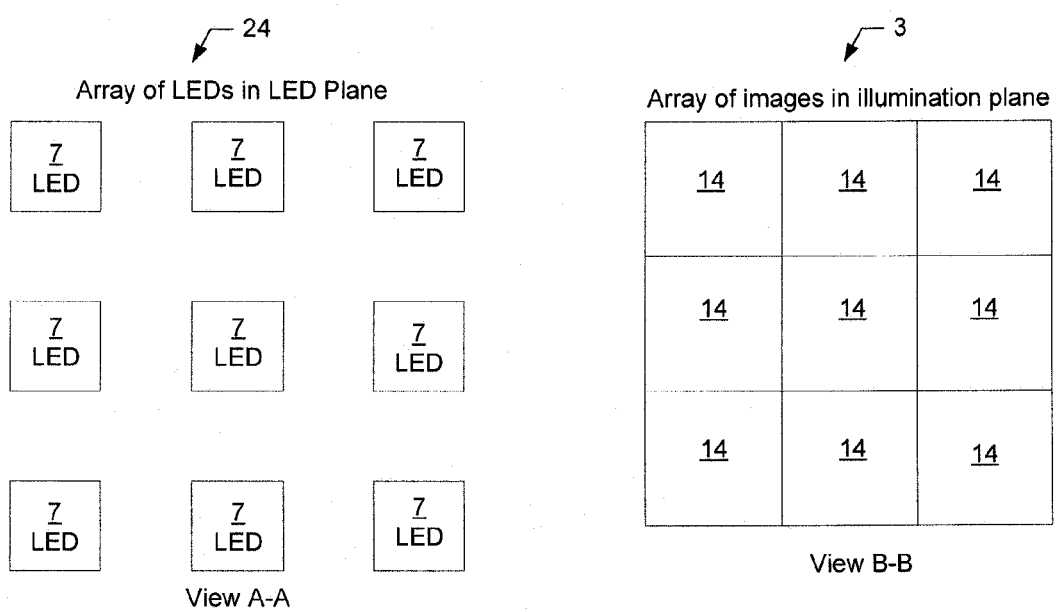
Figure 4:
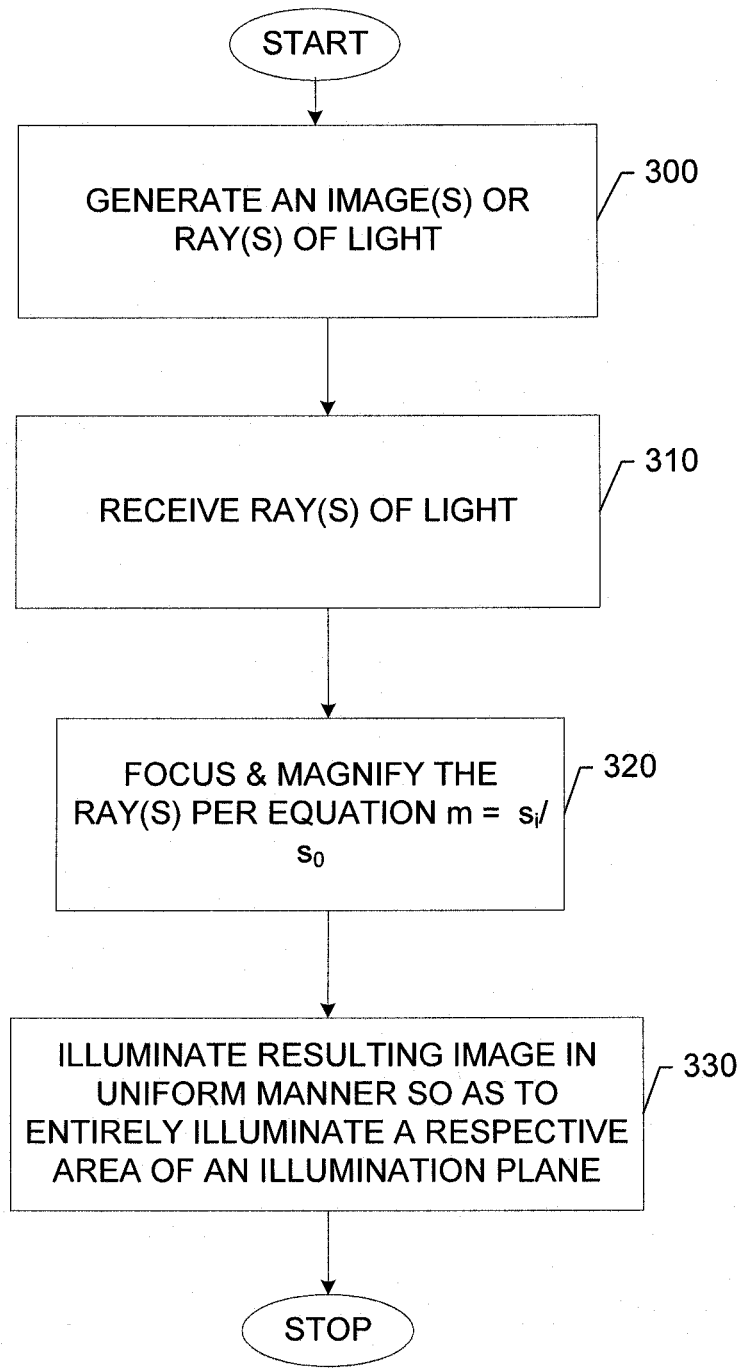

Having thus described the invention in general terms, reference will now be made to the accompanying drawings, which are not necessarily drawn to scale, and wherein:

FIG. 1 is a diagram of an imaging apparatus according to an exemplary embodiment of the present invention;

FIG. 2 is a diagram of an array of light emitting diodes in an LED plane according to an exemplary embodiment of the present invention;

FIG. 3 is a diagram of an array of images in an illumination plane according to an exemplary embodiment of the present invention; and FIG. 4 is a flowchart illustrating a method for producing a uniform irradiance in an illumination plane according to an exemplary embodiment of the present invention.

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Referring now to FIG. 1, a diagram of an imaging apparatus for producing a uniform irradiance distribution in an illumination plane is provided. The imaging apparatus 12 includes LEDs 7 in an LED array 24 (see FIG. 2, which shows a front view of the LED array 24), lenslets 5 in a lenslet array 10, and an illumination plane 3. As can be seen in FIG. 2, the LED array 24 includes a plurality of LEDs 7 arranged in a plurality of rows and columns in the same plane. In this exemplary embodiment, the LED array 24 may include 9 LEDs 7 in a 3×3 LED array 24. However, a 3×3 LED array 24 is merely provided for illustrative purposes and as such it should be noted that the LED array 24 may be any suitable size and may contain any suitable number of LEDs 7 (e.g., 16 LEDs 7 in a 4×4 LED array 24) without departing from the spirit and scope of the present invention. For instance, while a square array is shown, the array can be rectangular or any other desired shape. Also, while square LEDs 7 are shown, the LEDs 7 can be rectangular or any other desired shape, provided that the array of LED images in illumination plane 3 can be made contiguous such that the resulting irradiance distribution produced in the illumination plane 3 has no significant gaps. Each LED 7 includes a p-n junction (not shown) and is capable of emitting rays of light when electrically biased in a forward direction (e.g., biased with a positive voltage of 3.5V) across the p-n junction. In this regard, each of the LEDs 7 may serve as an excitation source. The emitted rays of light may include but are not limited to infrared, visible, near-ultraviolet and ultraviolet light. The one or more rays of light emitted from each of the LEDs 7 may be referred to herein as an imaging ray bundle. Each of the LEDs 7 may, but need not be Gallium (Ga) LEDs, Gallium nitride (GaN) LEDs or any other suitable type of LEDs capable of producing a desired wavelength.

The lenslet array 10 includes one or more lenslets 5, each of which are capable of receiving one or more rays of light from a respective LED 7 in the LED array 24 and each of the lenslets 5 are also disposed in a plurality of rows and columns in a common plane and generate a respective image at an illumination plane. (See FIG. 3, which shows a rear view of areas corresponding to images of an illumination plane 3) In this exemplary embodiment, the lenslet array 10 may be a 3×3 lenslet array 10 consisting of 9 lenslets 5. However, a 3×3 lenslet array 10 is only provided for illustrative purposes and as such it should be noted that the lenslet array 10 may be any suitable size and shape and may include and any suitable number of lenslets 5 (e.g., a 4×4 lenslet array 10 including 16 lenses 5). In an exemplary embodiment, the lenslet array 10 matches the LED array in size, shape and number. However, the lenslet array 10 may differ in size, shape and number with the LED array without departing from the spirit and scope of the present invention.

Additionally, each lenslet 5 of the lenslet array 10 has a minimum of 2 light-refracting surfaces 2 and 9. However, it should be pointed out that more than two light-refracting surfaces may be desired, for example to improve the uniformity of the irradiance distribution in the illumination plane by better controlling the direction of the transmitted rays of light. Each of the lenslets 5 are capable of focusing the rays of light received by the LEDs 7 and transmitting the focused rays of light, (i.e., the imaging ray bundle) via the light-refracting surfaces 2 and 9 to provide illumination at a distance $s_i$ (where $s_i$ is the distance from the lenslet array 10 to the image of the LED array, i.e., also referred to herein as the image distance) away from a final light-refracting surface such as, for example, light-refracting surface 9. In this regard, each of the lenslets 5 focuses the imaging ray bundle emitted at each single point on the respective LED to the vicinity of a corresponding single point on the image of the respective LED. The deviation of the focused imaging ray bundle from a single point at the image of the LED is defined by a respective lenslet point spread function, at the illumination plane 3. The shape of the point spread function of a given lenslet 5 can be controlled at least in part by the particular choices of lenslet material, the number of light-refracting surfaces 2 and 9, and shape of the light-refracting surfaces. The shape of the point spread function can thus be controlled in various ways in order to improve the uniformity of the irradiance distribution in the illumination plane. In this exemplary embodiment, while the power of the each of the lenslets 5 in the lenslet array 10 may be equal in the x and y directions, the power of the lenslets 5 in the x and y directions need not be equal. For instance, the lenslet 5 could magnify light received from a respective LED 7 in such a manner that the power of the light in the x-direction is more than the power of the light in the y-direction or vice versa. Unequal power in the x and y directions of the lenslets 5 produce point spread functions that allow usage of LEDs 7 that have rectangular emitting areas, square emitting areas and other suitable emitting areas (i.e., other suitable LED geometries and the like) to produce a relatively uniform irradiance distribution in the illumination plane. For instance, lenslets 5 with one or more light-refracting surfaces that have toroidal shapes (i.e., that have different curvatures in different cross-sections) may be used to produce square images 14 of rectangular LEDs 7. If the rectangular LEDs have equal pitch in the x and y directions, then the lenslets with toroidal light-refracting surfaces may thus be used to produce the desired irradiance distribution in the illumination plane. The particular embodiment of rectangular LEDs arranged in a square array is only a single example of many possible embodiments that include variously shaped LEDs in variously arranged array configurations. In each of the exemplary embodiments, the lenslet materials, number of surfaces, and surface shapes may be chosen to produce the desired point spread function.

The light emitted by each respective LED 7 is typically emitted uniformly over the emitting area of the LED. But there may be areas between the emitting areas of the LEDs 7 from which no light is emitted. The function of the lenslets 5 is to form images 14 of the respective LEDs 7 that are abutting in the illumination plane, such that there are no areas between the LED images 14 that are not illuminated. In this way the received light is spread evenly across the illumination plane 3. By appropriately magnifying the UV light provided by the LEDs, the illumination plane may be illuminated in a relatively uniform manner without deadbands or dark bands between the LED images in the illumination plane.

The light received by the illumination plane 3 may be used in many applications. For example, the light may be applied to (or may illuminate) a subject (e.g., a person, animal, etc.), object (e.g., an envelope or package containing a biological agent such as e.g., anthrax) or the like. The light with which the subject or object is illuminated may absorb energy of a specific wavelength and excite one or more fluorophores in the subject or object which causes fluorescence that re-emits energy at a different (but equally specific) wavelength. In this exemplary embodiment, the LED array 24, and the lenslet array 10 may be arranged in a semiconductor device, chip or the like. However, in an alternative exemplary embodiment, the LED array 24 and the lenslet array 10 may be comprised of separate LEDs 7 and lenses 5, not necessarily on the same chip, circuit board or the like and may comprise standalone LEDs 7 and lenslets 5 arranged in a respective array. The illumination plane 3 may be a standalone device, i.e., not necessarily on a chip, circuit board or the like.

As can be seen in FIG. 1, the LEDs 7 have the same center-to-center spacing as the lenslets 5. However, in alternative exemplary embodiments, the center-to-center spacing of the LEDs may be different from that of the lenslets 5. In this regard, it is not necessary that the spacings match provided the images are contiguous. Each lenslet 5 forms a separate image (i.e., light) that is generated by an individual LED 7.

The magnification, m, of the LED image that is formed at an area 14 of the illumination plane 3 is given by $$m = \frac{s_i}{s_o},$$

where $s_o$ is the distance from the LED array 24 to the lenslet array 10 (also referred to herein as the object distance), and $s_i$ is the distance from the lenslet array 10 to the image of the LED array 24 (also referred to herein as the image distance) formed at an area 14 of the illumination plane 3. The object distance may be chosen for a given lenslet array 10. Once the object distance, $s_o$, is chosen for a given lenslet array 10, the image distance, $s_i$, can be determined according to the first order lens equation:

$$s_i = \frac{s_o f}{(s_o - f)},$$

where f is the focal length of the lenslet 5 in the lenslet array 10.

For a given LED 7 size and separation (i.e., center-to-center distance between the LEDs 7), the object distance, $s_o$, and focal length, f, may be chosen such that the magnification, m, is equal to the ratio of the LED 7 separation to the LED 7 size. LED sizes and separations may vary widely. For LED arrays produced on a single chip the emitting areas are typically in the range of approximately 0.050 mm to 0.200 mm. The LED separations may be 0.200 mm to 0.600 mm, or more. Alternatively, the array of LEDs may be comprised of separate chips in separated packages, in which case the emitting areas will be the same, but the separations may be a few millimeters. Optical fibers may have core diameters that are 0.050 mm to 0.100 mm, and when arranged in a bundle may have separations of 0.100 mm to 3.5 mm. Since the dimensions of all LEDs in the array or fibers in the bundle will be approximately the same, each of the lenslets 5 may have approximately the same focal length, f. Additionally, the separation distance between each lenslet 5 and each LED 7 is chosen such that the images generated at a corresponding area of the illumination plane 3, which are generated by the LEDs 7, abut one another, and the illumination plane 3 is uniformly illuminated. In other words, there are no gaps and hence no areas of the illumination plane 3 that are not illuminated. The lenslets 5 account for the spacing between each of the LEDs 7 and focuses (using magnification m) the imaging ray bundle (i.e., images) generated by the LEDs 7, to a single point spread function in a manner that gets rid of the space between the images generated by the respective LEDs 7 so that each area 14 of a resultant image in the illumination plane 3 is illuminated uniformly and each area 14 of an image has with no gaps in between. So, while there is space between the individual LEDs 7, there is no space or gaps between respective images at the illumination plane 3.

It should be pointed out that FIG. 1 shows that one of the LEDs 7 generates rays of light (i.e., images) and a lenslet 5 that focuses and magnifies this light so that it is illuminated at the illumination plane 3 to form an image for sake of simplicity. However, all of the LEDs 7 and lenslets 5 of the exemplary embodiment of the present invention operate in an analogous manner.

Referring now to FIG. 4, a method of a flowchart for producing a uniform irradiance in an illumination plane according to an exemplary embodiment of the present invention is provided. In the imaging apparatus 12, each of the LEDs 7 generates an image or rays of light (Step 300). When the image(s) or rays of light (e.g., ultraviolet light) exit each LED 7 of the LED array 24, a respective lenslet 5 of the lenslet array 10 receives these rays (i.e., image ray bundle). (Step 310) The respective lenslet 5 focuses and magnifies the rays according to the equation given by $$m = \frac{s_i}{s_o}$$

such that these rays are focused at a single point on the illumination plane 3. (Step 320). A resulting image is illuminated at an area 14 of the illumination plane in such a manner as to entirely illuminate a respective area 14 of the illumination plane 3. (Step 330) In this regard, the lenslets 5 generate images that are adjacent to one another (i.e., images that abut each other with minimal overlapping) at the illumination plane 3.

It should be pointed out that minimizing the focal length of the lenslet array 10 and maximizing the lenslet 5 apertures maximizes the collection angle θ for light emitted from the light-emitting surface 9 of each lenslet 5. The collection angle θ for each lenslet 5 is approximately the same in the lenslet array 10. Given that the magnification of an LED image is equal to the ratio of the LED separation to LED size, the magnification of the light transmitted by each lenslet 5 is such that the ensemble of images (i.e., light) of the LEDs 5 cover the illumination plane 3 uniformly with minimal overlap. In this regard, each area 14 (which corresponds to an image generated by a respective LED 7) of the illumination plane 3 is illuminated resulting in relatively uniform irradiance in the final composite image of the illumination plane 3. As such, the image size of each area 14 of the illumination plane 3 is determined by the center-to-center spacing of the lenslets 5 and the size of the emitting areas of the LEDs 7. The resulting composite image in the illumination plane 3 is comprised of the abutting images generated by the LEDs 7, producing a uniform irradiance distribution. The irradiance distribution in the illumination plane 3 is equivalent to images generated by each of the LEDs 7 whose emitting area is equal to the total area of the LED array 24 and the resulting composite image has a total power equal to the aggregate total power of the LEDs 7 in the LED array 24.

In view of the foregoing, a method and apparatus are therefore provided according to exemplary embodiments, which allow individual LED emitters to be optimized for total power, with no uniformity or emitting area size tradeoffs, by using a lenslet array to produce a uniform irradiance in an image plane. The lenslet array is matched to an array of LEDs, so that each lenslet forms a separate image of an individual LED. The magnification of the images in an illumination plane are such that the resulting composite image is comprised of the abutting images of the LEDs, producing a uniform irradiance distribution wherein the resulting composite image has a total power equal to the total power of the LEDs in the LED array times the optical throughput of the lenslet array.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus comprising:
    one or more light emitting diodes (LEDs) arranged in one or more rows and columns of an LED array, each LED being configured to emit one or more rays of light;
    one or more lenslets arranged in one or more rows and columns of a lenslet array, each lenslet is configured to receive the one or more rays of light emitted from only one respective LED of the one or more LEDs, each of the one or more lenslets is configured to distribute the one or more rays of light and emit the distributed one or more rays of light; and
    an illumination plane comprising a biological agent or a chemical agent for receiving the distributed one or more rays of light in one or more areas arranged in one or more rows and columns of an array such that each area is entirely and uniformly illuminated by the distributed one or more rays of light that form one or more images that abut each other.

2. The apparatus according to claim 1, wherein each of the lenslets distribute the one or more rays of light with a magnification factor given by $m=s_i/s_o$, where $s_o$ is a distance from the LED array to the lenslet array and $s_i$ is a distance from each of the one or more lenslets to the illumination plane.

3. The apparatus according to claim 2, wherein the distance from each of the one or more lenslets to the respective area is defined by $s_i=s_o \times f/(s_o-f)$, where f is a focal length of a respective one of each of the one or more lenslets.

4. The apparatus according to claim 3, wherein each of the focal lengths of the one or more lenslets is substantially the same.

5. The apparatus according to claim 3, wherein each of the one or more areas correspond to a respective lenslet and a respective LED.

6. The apparatus according to claim 1, wherein the one or more images comprises a composite image, the composite image has a power equal to an aggregate total power of the one or more LEDs in the LED array times the optical throughput of the lenslet array.

7. The apparatus according to claim 1, wherein the one or more LEDs comprise an emitting area and an aggregate emitting area of all of the one or more LEDs is equal to a total area of the LED array.

8. The apparatus according to claim 1, wherein the one or more images that abut each other have no unilluminated gaps therebetween.

9. The apparatus according to claim 1, wherein each of the lenslets uniformly illuminate each area of the illumination plane by illuminating a respective area of the one or more areas forming a first image among the one or more images which does not substantially illuminate another area of the one or more areas forming a second image among the one or more images.

10. The apparatus of claim 1, wherein each of the light emitting diodes correspond to respective ones of the lenslets.

11. The apparatus of claim 1, wherein each of the one or more lenslets is configured to distribute the one or more rays of light by at least one of reflecting, refracting or diffracting the light.

12. The apparatus of claim 1, wherein in response to the biological agent or chemical agent being illuminated by the light, the biological agent or the chemical agent is configured to fluoresce at a wavelength that is different from a wavelength of the light.

13. A method comprising:
emitting one or more rays of light from respective ones of one or more light emitting diodes (LEDs) arranged in one or more rows and columns of an LED array;
receiving the one or more rays of light, emitted from the respective ones of the LEDs, at one or more lenslets arranged in one or more rows and columns of a lenslet array, wherein each of the lenslets receive the light emitted from only one respective LED of the LEDs;
distributing the one or more rays of light, at each of the one or more lenslets;
transmitting, at each of the one or more lenslets, the distributed one or more rays of light; and
receiving the one or more distributed rays of light at a respective area of an illumination plane comprising a biological agent or a chemical agent and one or more areas arranged in one or more rows and columns of an array, each of the one or more areas receives the distributed one or more rays of light from a respective lenslet and illuminates each area of the one or more areas entirely and uniformly, with the distributed one or more rays of light, forming one or more images that abut each other.

14. The method according to claim 13, wherein distributing comprises distributing the one or more rays of light at each of the one or more lenslets by magnifying the distributed one or more rays of light with a magnification factor given by $m=s_i/s_0$, where $s_0$ is a distance from the LED array to the lenslet array and $s_i$ is a distance from a light emitting surface of each of the one or more lenslets to the illumination plane.

15. The method according to claim 14, further comprising defining the distance from the light emitting surface of each of the one or more lenslets to the respective area is defined by $s_i = s_0 \times f/(s_0 - f)$, where f is a focal length of a respective one of each of the one or more lenslets.

16. The method according to claim 15, wherein each of the focal lengths of the one or more lenslets is substantially the same.

17. The method according to claim 16, wherein each of the one or more areas correspond to a respective lenslet and a respective LED.

18. The method according to claim 13, wherein each of the one or more images comprises a composite image, the composite image has a power equal to an aggregate total power of the one or more LEDs in the LED array times the optical throughput of the lenslet array.

19. The method according to claim 13, wherein each of the one or more LEDs comprises an emitting area and an aggregate emitting area of all of the one or more LEDs is equal to a total area of the LED array.

20. The method according to claim 13, wherein illuminating further comprises the one or more images that abut each other having no unilluminated gaps therebetween.

21. The method according to claim 13, wherein illuminating further comprises illumination of a respective area of the one or more areas forming a first image among the one or more images which does not substantially illuminate another area of the one or more areas forming a second image among the one or more images.

22. The method of claim 13, wherein each of the light emitting diodes corresponds to respective ones of the lenslets.

23. The method of claim 13, wherein each of the one or more lenslets is configured to distribute the one or more rays of light by at least one of reflecting, refracting or diffracting the light.

24. The method of claim 13, further comprising:
causing the biological agent or the chemical agent to fluoresce at a wavelength that is different from a wavelength of the light, in response to the biological agent or chemical agent being illuminated by the light.

* * * * *